United States Patent [19]
Kaneko

[11] Patent Number: 5,289,621
[45] Date of Patent: Mar. 1, 1994

[54] PLASTIC FASTENER

[75] Inventor: Yoshio Kaneko, Chigasaki, Japan

[73] Assignee: Nifco, Inc., Yokohama, Japan

[21] Appl. No.: 70,827

[22] Filed: Jun. 3, 1993

[30] Foreign Application Priority Data

Jun. 4, 1992 [JP] Japan .................. 4-185626

[51] Int. Cl.5 .............................. A44B 21/00
[52] U.S. Cl. ...................... 24/453; 24/297; 411/510; 411/522
[58] Field of Search ............... 24/453, 297, 41, 573.1; 411/396, 508, 510, 522; 403/405.1

[56] References Cited

U.S. PATENT DOCUMENTS

| | | | |
|---|---|---|---|
| 1,205,883 | 11/1916 | Gay | 24/453 |
| 3,381,344 | 5/1968 | Tinnerman | 24/453 |
| 3,534,650 | 10/1970 | Kubokawa | 24/453 |
| 5,092,723 | 3/1992 | Compton et al. | 411/396 |

FOREIGN PATENT DOCUMENTS 0839089  6/1960  United Kingdom .................. 24/453

Primary Examiner—Victor N. Sakran
Attorney, Agent, or Firm—Schwartz & Weinrieb

[57] ABSTRACT

A fastener that can be readily disengaged includes a post that has engaging claws provided on the peripheral face of the end thereof, and a contact plate that engages with the top end of the post to thereby act in concert with the engaging claw to clamp panels or the like therebetween, in which the top end of the post is formed as an inclined face portion that slopes upward from a point on the peripheral surface of the post midway up along the length of the top end, an engaging portion that extends peripherally is formed on the peripheral surface on the opposite side to the inclined face portion, and the contact plate is provided with a through hole to receive the top end of the post, in which one part of the hole edge is contacted with the inclined face portion and the other part of the edge engages with the engaging portion.

6 Claims, 5 Drawing Sheets

PLASTIC FASTENER

BACKGROUND OF THE INVENTION

1. Field of the Invention

The present invention relates to a plastic fastener that is used for fastening panels in a state of mutual contact or for fastening parts to panels.

2. Description of the Prior Art

Plastic fasteners are extensively used for affixing components in cars, electrical appliances and the like. Their good manufacturability, ease of use and other such qualities have made plastic fasteners an essential element for attaching automobile components.

The shape and form of such plastic fasteners depends on how and where they are used. Fasteners used for attaching panels together or attaching parts to panels usually consist of a main post member for insertion into through holes formed in the panels or in the panel and component, barbed retainer pieces provided at the end of the post to stop the post being withdrawn, and a contact plate member that is provided at the top end of the post and acts in concert with the retainer pieces to clamp the panels together, or a component to a panel, therebetween, and the fastening usually can be accomplished by the insertion of the post through the holes.

First and foremost, a fastener has to be able to fulfill its function of fastening. However, to enable parts to be replaced, for inspection and maintenance purposes, and for disassembly for disposal purposes and the like, it is also important to be able to unfasten fasteners. Conventional fasteners have responded to this need in various ways. One way is by making the post hollow and inserting a pin into the hollow space from the end of the post to thereby expand the end and cause the retainers to lock into engagement, whereby the fastener can be unlocked by removing the pin; in another arrangement, the fastener is unfastened by rotating the post in position in the holes to align the retainers with a slot formed in the holes, thereby allowing the post to be withdrawn.

However, whether it is a matter of withdrawing a pin or of rotating a member, in each case these are operations that have to be directly applied to remove the fastener, and under actual work conditions such operations are difficult to do. For example, there has to be enough space to withdraw a pin, and turning a post involves the use of tools and it is necessary to ensure that there is enough space for the task.

OBJECT AND SUMMARY OF THE INVENTION

An object of the present invention is to provide a fastener that can be unfastened without using special tools or unfastening actions directly applied to the fastener.

Another object of the present invention is to provide a fastener that can be readily unfastened without requiring working space therefor and is therefore not limited as to where it can be used.

To attain the above object, the present invention provides a readily disengagable fastener, comprising: a post that has engaging claw means provided on the peripheral face of the end thereof, and a contact plate that engages with the top end of the post to thereby act in concert with the engaging claw to clamp panels or the like therebetween, wherein the top end of the post is formed as an inclined face portion that slopes upward from a point on the peripheral surface of the post midway up along the length of the top end, an engaging portion that extends peripherally is formed on the peripheral surface on the opposite side to the inclined face portion, and the contact plate is provided with a through hole to receive the top end of the post, in which one part of the hole edge is contacted with the inclined face portion and the other part of the edge engages with the engaging portion.

The engaging portion of the post may be in the form of a peripheral rim or groove. A round cross-section is a suitable shape for the post, but an oval or other shape is also applicable. However, inasmuch as the post is inserted into a hole of the same shape formed in a panel, and it is easier to form a round hole, using a round post is advantageous.

To uncouple the fastener the contact plate is moved horizontally with the inclined face portion at the top of the post acting as a guide in contact with the edge of the hole, whereby the part of the edge at the other side of the hole is disengaged from the groove, thereby releasing the engagement between post and contact plate. Preferably the angle of the inclined face portion is about 45 degrees relative to the axis of the post, to facilitate the horizontal movement of the contact plate. The engagement between the engaging portion of the post and the edge of the hole in the contact plate utilizes the flexibility of the material.

Thus, the contact plate is moved horizontally along the inclined face portion of the post to disengage the contact plate edge from the post and thereby unfasten the fastener. However, usually this unfastening operation is impeded by the inclined face portion abutting the hole edge, which causes resistance to the horizontal movement of the contact plate. Thus, with the contact plate hole edge in engagement with the engaging portion of the post and the upward movement of the post is therefore restricted, the other portion of the edge that is in contact with the inclined face portion is forced upwards along the inclined face, whereby disengagement occurs automatically.

As described, therefore, the fastener of this invention is fastened by inserting the top of the post into a hole formed in the contact plate and causing part of the edge of the hole to engage with an engagement portion formed on the periphery of the post, locking them securely together. To unfasten the fastener, the contact plate is moved horizontally with respect to the post by sliding the edge of the hole upwards along the inclined face portion, thereby disengaging the edge at the other side.

Another object of the invention is to provide such a fastener in which the post and contact plate can be disengaged by the horizontal movement of panels or components fastened by the fastener. In the above fastener arrangement according to this invention, the lower surface of the contact plate is provided with a projection which extends downward from the edge at the part that abuts the inclined face of the post, forming a sliding contact surface. This projection locates in holes formed in the panels, components to which the fastener is applied, whereby the fastener can be disengaged by sliding the panel or component up the inclined face.

Further features of the invention, its nature and various advantages will be more apparent from the accompanying drawings and following detailed description of the invention.

DESCRIPTION OF THE PREFERRED EMBODIMENTS

Figure 1:
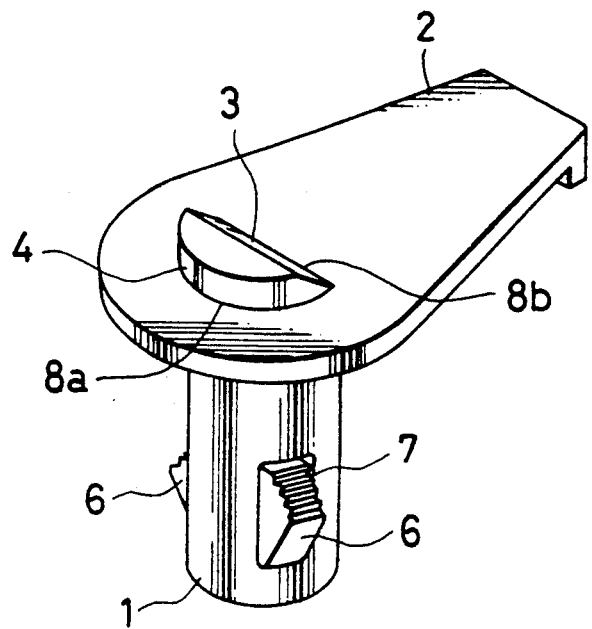
FIG. 1 is a perspective view of a first embodiment of the fastener according to the present invention.
Figure 2:
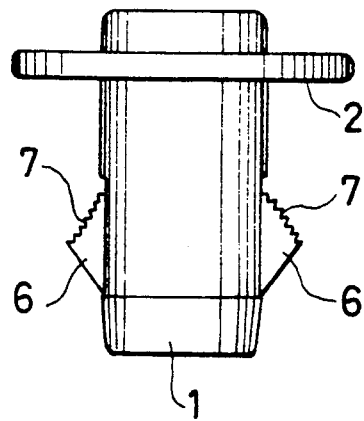
FIG. 2 is a front view of the same fastener.
Figure 3:
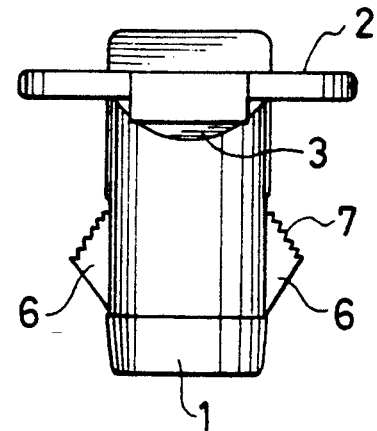
FIG. 3 is a rear view of the same fastener.
Figure 4:
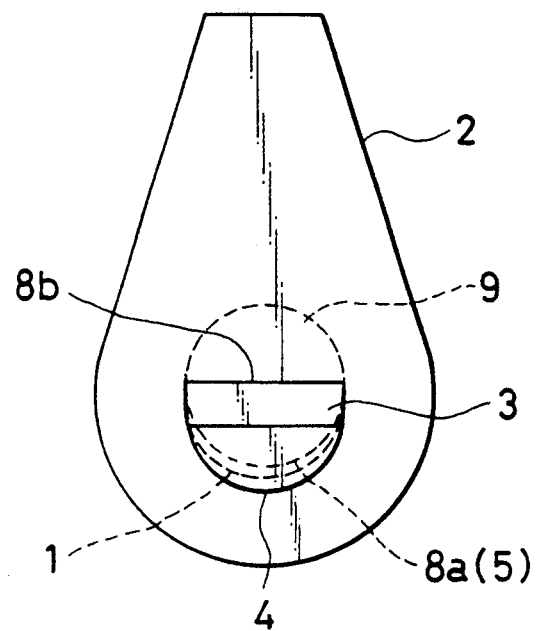
FIG. 4 is a plan view of the same fastener.
Figure 5:
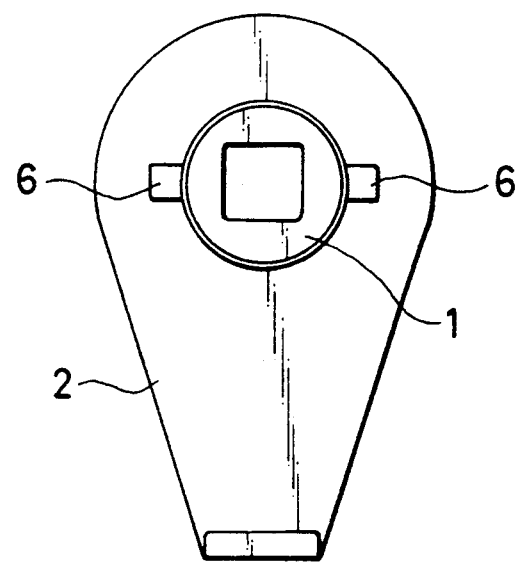
FIG. 5 is a bottom view of the same fastener.
Figure 6:
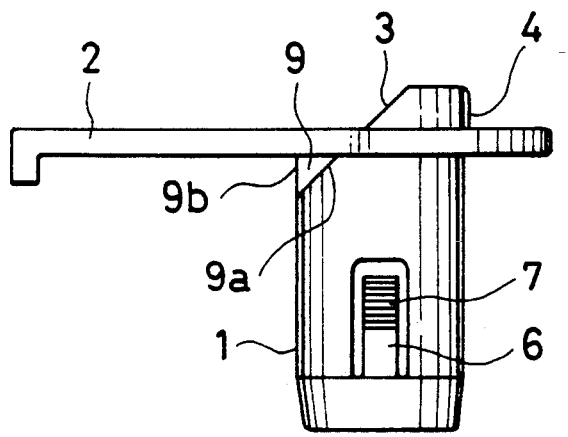
FIG. 6 is a view of the same fastener from the left side.

FIGS. 1 to 7 show a fastener according to a first embodiment of the invention in which reference numeral 1 denotes a post and 2 a contact plate that associates with the post 1 to form a fastener. In this embodiment the post 1 is round. The top end of the post is formed as an inclined face 3 portion that slopes upward starting at a point midway up the peripheral surface of the post. The peripheral surface 4 on the other side of the inclined face portion has a semicircular engaging groove 5 that extends peripherally.

Figure 7:
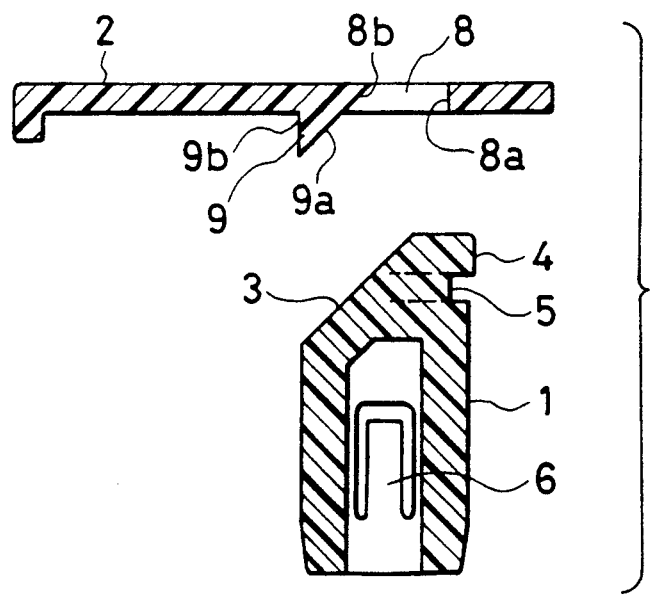
FIG. 7 is a cross-sectional view of the same fastener showing, from left side, the post and contact plate in a disengaged state.

Here the inclined face 3 is formed at an angle of about 45 degrees relative to the central axis of the post, and the groove 5 is formed so that the ends thereof are substantially midway between the edges of the inclined face portion (FIG. 7). The post 1 thus provided with the inclined face 3 and the groove 5 has a hollow portion provided by forming a hole that starts from the end and extends axially up into the lower half of the post. Cutout portions are arranged in the peripheral surface of the post 1 for a pair of opposed claws 6. The outer face of the claws 6 protrudes, forming a chevron shape, and the upper surface 7 thereof is ridged.

One edge of the contact plate 2 is extended, giving the plate a cam-like shape. A semicircular hole 8 is centrally formed in the contact plate 2. This hole 8 is provided to engage with the top part of the post 1. For this, a semicircular edge portion 8a of the hole 8 is arranged so that it fits into the groove 5, while the straight edge 8b at the other side abuts the flat, sliding contact surface of the inclined face 3. The inner surface of the edge 8b is formed at an angle that matches the slope of the inclined face 3, and extends into a slide projection 9 that protrudes downwards from the lower surface of the contact plate 2. The slide projection 9 extends by an amount that is determined according to the thickness of the panel to be fastened, and is provided with a flat angled slide face 9a that conforms to the edge 8b, and, on the opposite side, a curved surface section 9b that conforms to the peripheral surface of the post 1.

As described, the post 1 and contact plate 2 make up the fastener of this invention and can be individually formed of polyacetal, polypropylene or other such thermosetting plastic possessing the appropriate stiffness and resilience, and then assembled together. The post 1 can be formed first, and then followed by the forming of the contact plate 2 with the post still in the mold to thereby produce the fastener as an integrated assembly for increased production efficiency.

When the parts are formed separately, the fastener is assembled by arranging the post 1 upright and bringing the top part thereof up into the semicircular hole 8 and bringing the center part of the groove 5 into engagement with the center part of the semicircular edge 8a, then using this engagement as a pivot to push the other edge portion 8b up against the inclined face 3 of the post 1, whereby the top of the post 1 is received into the hole 8, the fastening being completed by bringing the edge 8a and groove 5 into full end-to-end engagement.

The locked fastener is used in the same way as other fasteners. This will now be explained with reference to using the fastener to clamp the automotive parts shown in FIGS. 8 and 9, that is, to clamp a plastic bumper face B2 to a metal bumper beam B1. The means used to fasten the bumper face B2 is one that enables the plastic member to be readily separated from the metal member for replacement purposes and the like. However, it is to be understood that the fastener of this invention is not limited to this usage.

Figure 8:
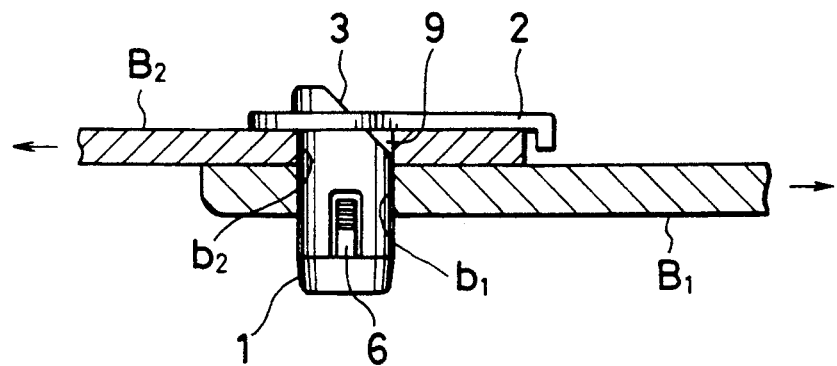
FIG. 8 is a view of the same fastener in use, shown from the right side.

The bumper beam B1 and bumper face B2 have preformed holes b1 and b2 to allow insertion of the post 1, with b1 being a round hole that matches the outer diameter of the post, and b2 being formed as an ellipsoid to allow for positional deviation. The bumper face B2 is attached by aligning holes b1 and b2 and the post 1 inserted head first. The clamped state is shown by FIG. 8. The two components are clamped by the claws 6 engaging the edge of the hole b1 under the bumper beam B1 and the contact of the contact plate 2 on the upper surface of the bumper face. The angled slide face 9a is arranged so that it faces the inner edge of the hole b1, and the height of the slide projection 9 is made substantially the same as the thickness of the bumper face B2.

Figure 9:
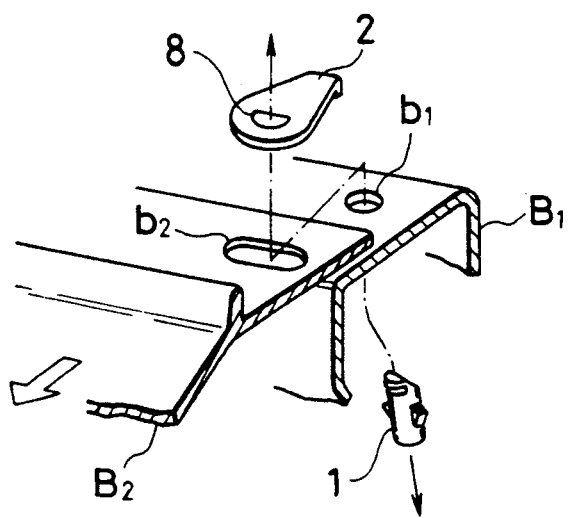
FIG. 9 illustrates how the fastener is disengaged by moving a panel component.

The bumper beam B1 and bumper face B2 are thus clamped together by the claws 6 and the contact plate 2, and are maintained in this state by the engagement of the edge 8a in the groove 5, which prevents the contact plate 2 slipping upwards out of position. While the fastener of this invention thus functions as a normal fastener, with the bumper beam B1 and bumper face B2 being clamped by the engagement of the claws 6 when the post 1 is inserted through the holes b1 and b2, it also enables the post 1 to be disengaged from the contact plate 2 by pulling the bumper beam B1 and bumper face B2 in the direction indicated by the arrow, which slides the projection 9 upward along the inclined face 3 while also moving the contact plate 2 horizontally, disengaging the edge 8a from the groove 5 and the post 1 from contact plate 2 and, hence, allowing the bumper face B2 to be separated from the bumper beam B1. FIG. 9 shows the disengaged post 1 and contact plate 2 and the bumper face B2 removed from the bumper beam B1.

The above embodiment has been described with reference to an arrangement in which pulling a pair of panel plates clamped together causes the slide projection 9, with the contact plate 2, to slide up along the inclined face 3, whereby the horizontal movement thus produced results in the edge 8a of the hole 8 disengaging from the groove 5. However, it is also possible to provide a hook on the upper surface of the contact plate 2 and use this hook to pull the contact plate 2 up the inclined face 3, with the horizontal movement involved disengaging the plate from the groove 5. In other words, the slide projection 9 forms a means of uncoupling panels or removing components attached to panels by an indirect operation involving displacing the plane of one part relative to another, wherein there is no need to touch the fastener.

The post 1 and contact plate 2 can be reused by using the same fastening procedure. Also, instead of using the horizontal movement of the contact plate 2 produced by the inclined face 3 to effect disassembly, in the case of the illustrated embodiments, disengagement could be effected by pulling up on an edge extension portion. Owing to the pliancy of the material, pulling up the edge of the contact plate draws up the edge 8b abutting the inclined face 3, thus deforming the hole 8, which causes the edge 8a to disengage starting from the ends of the groove 5, thereby uncoupling the fastener.

In the fastener according to this invention, therefore, disengagement can be achieved by shifting the contact plate 2 with respect to the post along the inclined face 3, and, in addition, the fastener can also be disengaged by lifting the edge of the contact plate, specifically by lifting it at the edge 8a portion that abuts the inclined face 3. Moreover, as the above description shows, moving the contact plate 2 simultaneously sideways and upwards along the inclined face 3 disengages the edge 8a from the groove 5. If the angle of the inclined face 3 relative to the central axis of the post 1 is increased, such as to nearly 90 degrees, for example, less force would be needed to produce the horizontal movement leading to disengagement.

Figure 10:
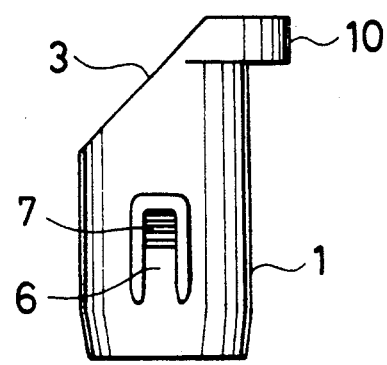
FIG. 10 is a side view of a fastener post according to a second embodiment.
Figure 11:
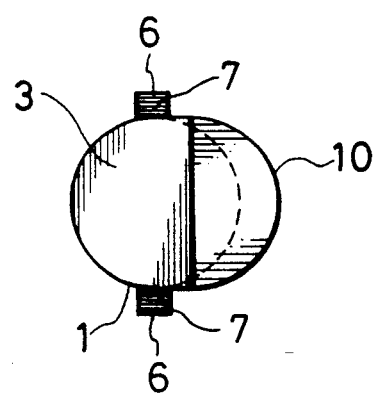
FIG. 11 is a plan view of the post shown in FIG. 10.

FIGS. 10 and 11 illustrate a second embodiment in accordance with which the upper part of the post 1 is provided with a round projection 10 that extends from the periphery thereof for engagement with the upper surface of the contact plate 2.

What is claimed is:

1. A fastener that can be readily disengaged, comprising: a post member having engaging claw means on a peripheral face at an end of the post member, and a contact plate member that engages with a top end of the post member to thereby act in concert with the engaging claw means to clamp panels therebetween; wherein the top end of the post member is formed as an inclined face portion that slopes upward from a point on the peripheral surface of the post member midway up along the length of the top end; a peripherally extending engaging portion is formed on a peripheral surface on the opposite side to that of the inclined face portion, and the contact plate member has a through hole formed therein to receive the top end of the post member, with part of an edge of said hole contacting the inclined face portion and another part of the edge engaging with the engaging portion.

2. A fastener according to claim 1 in which the engaging portion of the post member is an engaging groove that conforms to part of an edge of the through hole formed in the contact plate member.

3. A fastener according to claim 1 in which the engaging portion of the post member is a curved projection extending from the peripheral surface.

4. A fastener according to claim 1 in which the post member is columnar in shape and has a round cross-section.

5. A fastener according to claim 1 in which the inclined face portion at the top end of the post member is formed as a flat slide face and a part of an edge of the through hole in the contact plate member corresponding to said inclined face portion is formed as a straight contact surface.

6. A fastener according to claim 5 in which the lower surface of the contact plate member is provided with a slide projection that adjoins the straight edge of the through hole and contacts the inclined face portion at the top end of the post member.

* * * * *